United States Patent
Bartos et al.

(10) Patent No.: US 9,368,827 B2
(45) Date of Patent: Jun. 14, 2016

(54) HORIZONTAL HIGH SPEED STACKING FOR BATTERIES WITH PRISMATIC CANS

(71) Applicant: GM Global Technology Operations LLC, Detroit, MI (US)

(72) Inventors: Andrew L. Bartos, Clarkston, MI (US); Yhu-Tin Lin, Rochester Hills, MI (US); Raymond D. Turner, III, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 13/972,224

(22) Filed: Aug. 21, 2013

(65) Prior Publication Data

US 2015/0052741 A1 Feb. 26, 2015

(51) Int. Cl.
*H01M 10/04* (2006.01)
*H01M 2/10* (2006.01)
*H01M 2/02* (2006.01)
*B65G 57/32* (2006.01)

(52) U.S. Cl.
CPC ........ *H01M 10/0404* (2013.01); *H01M 2/1077* (2013.01); *B65G 57/32* (2013.01); *H01M 2/0217* (2013.01); *Y10T 29/53135* (2015.01)

(58) Field of Classification Search
CPC .......... H01M 10/0404; H01M 2/0217; H01M 2/1077; Y10T 29/53135; B65G 57/32
See application file for complete search history.

(56) References Cited

U.S. PATENT DOCUMENTS

| | | | |
|---|---|---|---|
| 3,519,489 A | 7/1970 | Port | |
| 3,841,915 A | 10/1974 | Eberle | |
| 4,510,682 A | 4/1985 | Sabatino et al. | |
| 4,824,307 A * | 4/1989 | Johnson | B65H 33/18 198/456 |
| 5,454,687 A * | 10/1995 | Johnson | B65G 57/32 198/370.1 |
| 5,840,087 A | 11/1998 | Gozdz et al. | |
| 6,021,887 A * | 2/2000 | Redden | A46B 13/04 198/463.4 |
| 6,800,100 B2 | 10/2004 | Benson et al. | |
| 7,625,665 B2 | 12/2009 | Jeon et al. | |
| 8,353,970 B2 | 1/2013 | Wells et al. | |
| 2006/0045725 A1 * | 3/2006 | von Werder | B65G 57/32 414/795.3 |
| 2006/0177731 A1 | 8/2006 | Lambert | |
| 2013/0255068 A1 | 10/2013 | Turner, III | |
| 2014/0178736 A1 | 6/2014 | Gandhi et al. | |

OTHER PUBLICATIONS

Election/Restrictions dated Jan. 16, 2015 pertaining to U.S. Appl. No. 13/835,858, filed Mar. 15, 2013.

* cited by examiner

*Primary Examiner* — Carlos Barcena
*Assistant Examiner* — Lilia V Nedialkova
(74) *Attorney, Agent, or Firm* — Quinn Law Group, PLLC

(57) ABSTRACT

A system and method for stacking battery cells or related assembled components. Generally planar, rectangular (prismatic-shaped) battery cells are moved from an as-received generally vertical stacking orientation to a generally horizontal stacking orientation without the need for robotic pick-and-place equipment. The system includes numerous conveyor belts that work in cooperation with one another to deliver, rotate and stack the cells or their affiliated assemblies. The belts are outfitted with components to facilitate the cell transport and rotation. The coordinated movement between the belts and the components promote the orderly transport and rotation of the cells from a substantially vertical stacking orientation into a substantially horizontal stacking orientation. The approach of the present invention helps keep the stacked assemblies stable so that subsequent assembly steps—such as compressing the cells or attaching electrical leads or thermal management components—may proceed with a reduced chance of error.

10 Claims, 7 Drawing Sheets

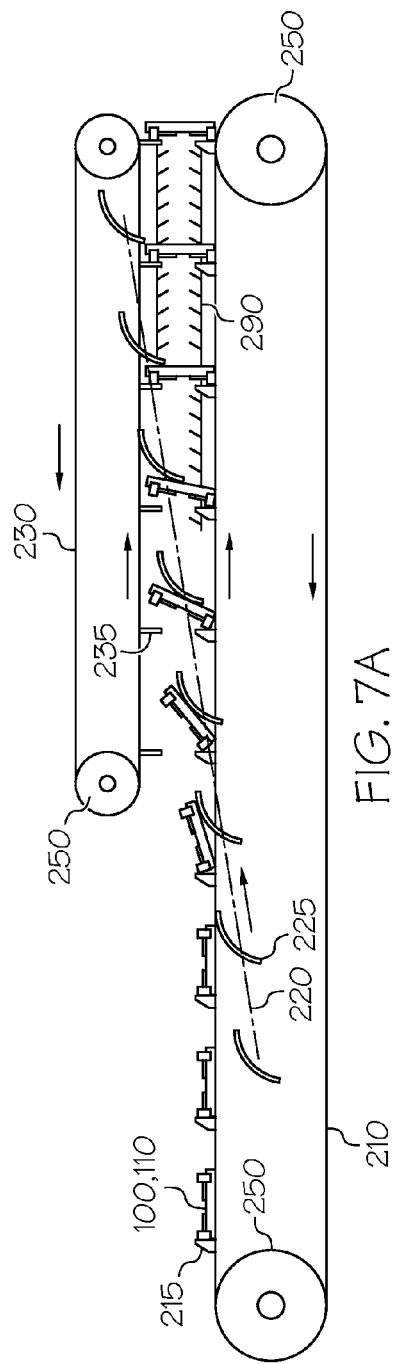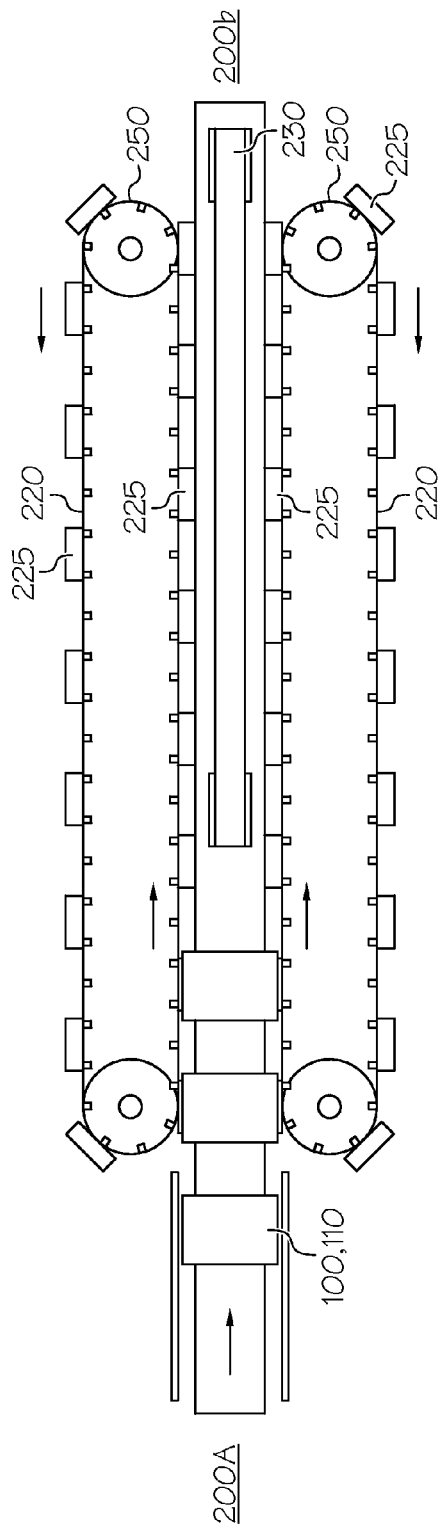

HORIZONTAL HIGH SPEED STACKING FOR BATTERIES WITH PRISMATIC CANS

STATEMENT REGARDING FEDERALLY SPONSORED RESEARCH OR DEVELOPMENT

This invention was supported by the government under a grant under Contract No. DE-EE0002217 awarded by the Department of Energy. The government has certain rights in the invention.

BACKGROUND OF THE INVENTION

This invention relates generally to a way to improve the manufacture of individual battery cells into assembled modules, and more particularly to the assembly of prismatically-shaped cans of cells using high-speed battery stacking.

The increasing demand to improve vehicular fuel economy and reduce vehicular emissions has led to the development of both hybrid vehicles and pure electric vehicles. Pure electric vehicles may be powered by a battery pack (which is made up of numerous smaller modules or cells), while hybrid vehicles include two or more energy sources, such as a gasoline (also referred to as an internal combustion) engine used as either a backup to or in cooperation with a battery pack. There are two broad versions of hybrid vehicles currently in use. In a first version (known as a charge-depleting hybrid architecture), the battery can be charged off a conventional electrical grid such as a 120 VAC or 240 VAC power line. In a second version (known as a charge-sustaining hybrid architecture), the battery receives all of its electrical charging from one or both of the internal combustion engine and regenerative braking. In one form of either version, the pack is made from numerous modules, which in turn are made up of numerous individual cells.

Typically, the individual cells that make up a module are of a generally rectangular, planar (or prismatic) structure that includes alternating stacks of sheet-like positive and negative electrodes having a similarly-shaped electrolytic separator disposed between each positive and negative electrode pair; these separators are used to prevent physical contact between positive electrodes and negative electrodes within each cell while enabling ionic transport between them. In one form, the separators are configured to absorb the liquid electrolyte of the cell. Cooling features are also frequently employed to convey away the heat generated by the various individual cells during the charging and discharging activities associated with battery operation; in one form, such cooling features may be formed as yet another generally planar sheet-like device that can be added between the various cells as part of the stacked arrangement of components that make up the module. Connection tabs extend from a peripheral edge of each cell to allow mechanical and electrical connection between the electrodes of the individual battery cells. Proper alignment of the various tabs is generally required to ensure low electrical resistance to bus bars or related conductors, as well as for robust mechanical connectivity. These prismatic cells typically have either a soft, flexible case (called "pouch" cells) or a hard rigid case (called "can" or "cannular" cells). Depending on the application, the individual battery cells may be arranged in series, parallel or combinations thereof to produce the desired voltage and capacity. Numerous frames, trays, covers and related structure may be included to provide support for the various cells, modules and packs, and as such help to define a larger assembly of such cells, modules or packs.

Due to the prismatic dimensions, the current common practice for handling the rigid cannular cells during assembly is by stacking them along a generally vertical axis (for example, along the so-called y-axis in the well-known Cartesian coordinate system) such that the cells and frames are loaded with their largest flat surfaces laying down. However, the slightly bulged flat cells and the nesting geometries of the frames require them be stacked with the subassemblies standing up on their narrow, but flat edge surfaces. The cells may become bulged for various reasons; one such reason is due to increases in mechanical pressure that may arise from electrode expansion during operation that presses on the can walls, or internal gaseous pressure. In one particular instance, such expansion may be caused by electrolyte evaporation as heat is generated during operation, while in another, electrochemical reactions within the cell may create gaseous byproducts. As such, changes in stacking orientation may be required. Unfortunately, such changes in orientation can be a complex, expensive and inefficient process.

In one form, it is known to manufacture a battery module assembly by using robotic pick-and-place component transport systems. Such approaches remove the cells from the shipping dunnage, transfer the cells via conveyor to an initial process step (typically in the form of electrical verification) and then transfer them via robotic pick-and-place equipment to the high precision carrier. Such approaches are useful for assembling layered cells that have tight placement tolerance requirements, as well as those with special handling needs. While this method is effective for protecting the cell during the assembly operation, it also leads to expensive tooling and wasted assembly time to locate the carrier in position, remove the part for the specific station operation and then return the part to the carrier to move to the next operation. This in turn forces packaging and tooling operations to become more complex and expensive.

A previous horizontal battery stacking mechanism, which is described in co-pending application entitled LARGE FORMAT CELL HANDLING FOR HIGH SPEED ASSEMBLY, application Ser. No. 13/835,858 filed on Mar. 15, 2013 that is owned by the Assignees of the present invention and incorporated herein by reference, discloses the use of a conveyor belt with cams, lifters and guides to enable high speed assembly for large format cells that go through cell re-orientation and part sequencing steps. While useful for its intended purpose, the cams and the lifters that move in response to the cams still need to go through retracting and recirculating movements once the assemblies have been pressed together at the stacking stand. This in turn requires that the lifters, cam-followers and related equipment be returned to the place where they first engage the assemblies; during this return trip, they are not being used to help the assemblies being carried along the system.

What is needed is a battery stacking approach that permits low cost, high speed continuous assembly that eliminates the need for high precision packaging and tooling, and that allows for reduced part cost by permitting larger dimensional variation. A battery stacking system employing such an approach would also occupy a relatively small manufacturing floor space footprint.

SUMMARY OF THE INVENTION

According to an aspect of the present invention, a system for stacking numerous prismatic-shaped battery cells includes conveyor belts cooperative with one another to transport, rotate and stack the cells. The cooperation includes transporting the cells along a first of these belts while one or more lifting devices coupled to a second of these belts causes the cells to rotate. In this way, the largest, generally planar surface of cells is oriented in a substantially horizontal stacking direction. The system also includes one or more driving devices to operate the belts; as well as a receptacle to receive the rotated cells from the first belt. The movement of the belts is coordinated to have cell transporting, rotating and stacking operations take place in an orderly, registered manner without the need for the cells to be robotically picked from or added back to the belts of the system. In particular, the stacking system receives the cells (or their corresponding assemblies) such that when each cell arrives, its stacking surface is oriented along a substantially non-horizontal direction. The system moves the cells along a first conveyor belt such that a lifter (also called a flipper or flipping device) situated on a second conveyor belt causes the cells to rotate into a substantially horizontal direction; in this way, a subsequent facingly adjacent contact between successive cells (or a frame that is used as part of each cell assembly) can take place along a substantially horizontal direction. Once this stacking is completed, the aligned cell (or their respective assemblies) can then be compressed or otherwise secured along this horizontal axis, after which electrical, mechanical or cooling connection may be implemented to form an assembled battery module, section or related component. Benefits of the system of the present invention include low cost, high speed assembly of battery modules and battery packs by eliminating the need for high precision packaging and tooling. Furthermore, the system promotes reduced part cost by allowing more dimensional variation than from a traditional pick-and-place system. In the present context, the stacking of battery cells is meant to include situations where the cell is part of a larger assembly (such as a cell attached to a companion frame). As such the terms "cells", "assemblies" and their variants can be used interchangeably in this disclosure unless the particular context dictates otherwise.

According to another aspect of the present invention, a system for assembling a battery module is disclosed. The system includes a first conveyor belt with numerous backstops arranged in a spaced, repeating fashion on its cell-engaging surface, as well as a second conveyor belt with numerous flippers spaced in a similar repeating fashion along its respective cell-engaging surface. The first and second belts cooperate with one another such that one of the backstops facilitates translation of the cells from a receiving end of the system (i.e., where the system first encounters or picks up the individual cells) to a stacking end of the system. Likewise, a corresponding one of the flippers facilitates rotation of the largest, generally planar surface of the prismatic shape of the cells from a substantially non-horizontal direction at the receiving end of the system to a substantially horizontal direction at the stacking end of the system. The system also includes one or more driving devices to provide motive power to one or more of the belts. The system further includes a stacking stand situated at the stacking end of the system to receive the translated and rotated cells. The stacking stand may also be used to either compress the stack or cooperate with a compressing mechanism to compress the stack. Additional equipment may also be included to place a support structure onto the stack while the stack is in its compressed state.

According to yet another aspect of the present invention, a method of assembling battery pack components into a battery module assembly is disclosed. In particular, the method includes a stacking mechanism (also referred to herein as a stacking system) that employs conveyor belts and a flipping device or related mechanism that permit battery assemblies to be stacked horizontally irrespective of their initial stacking orientation. As mentioned above, the cells and their related assemblies define a generally rectangular or prismatic shape; in this way, the cell or assembly has a generally planar surface that forms the largest projected area, as well as numerous edges formed around the generally rectangular periphery of the planar surface; it is the large, generally planar surface that is used as the stacking surface.

BRIEF DESCRIPTION OF THE DRAWINGS

The following detailed description of specific embodiments can be best understood when read in conjunction with the following drawings, where like structure is indicated with like reference numerals and in which:

FIG. 7A shows a side elevation view of an alternate embodiment of the stacking mechanism of the present invention, with some details removed for clarity; and FIG. 7B shows a top-down view of the alternate embodiment of FIG. 7A, emphasizing how the belt with the flippers engages the cells or assemblies from a different orientation.

DETAILED DESCRIPTION OF THE PREFERRED EMBODIMENTS

Figure 1:
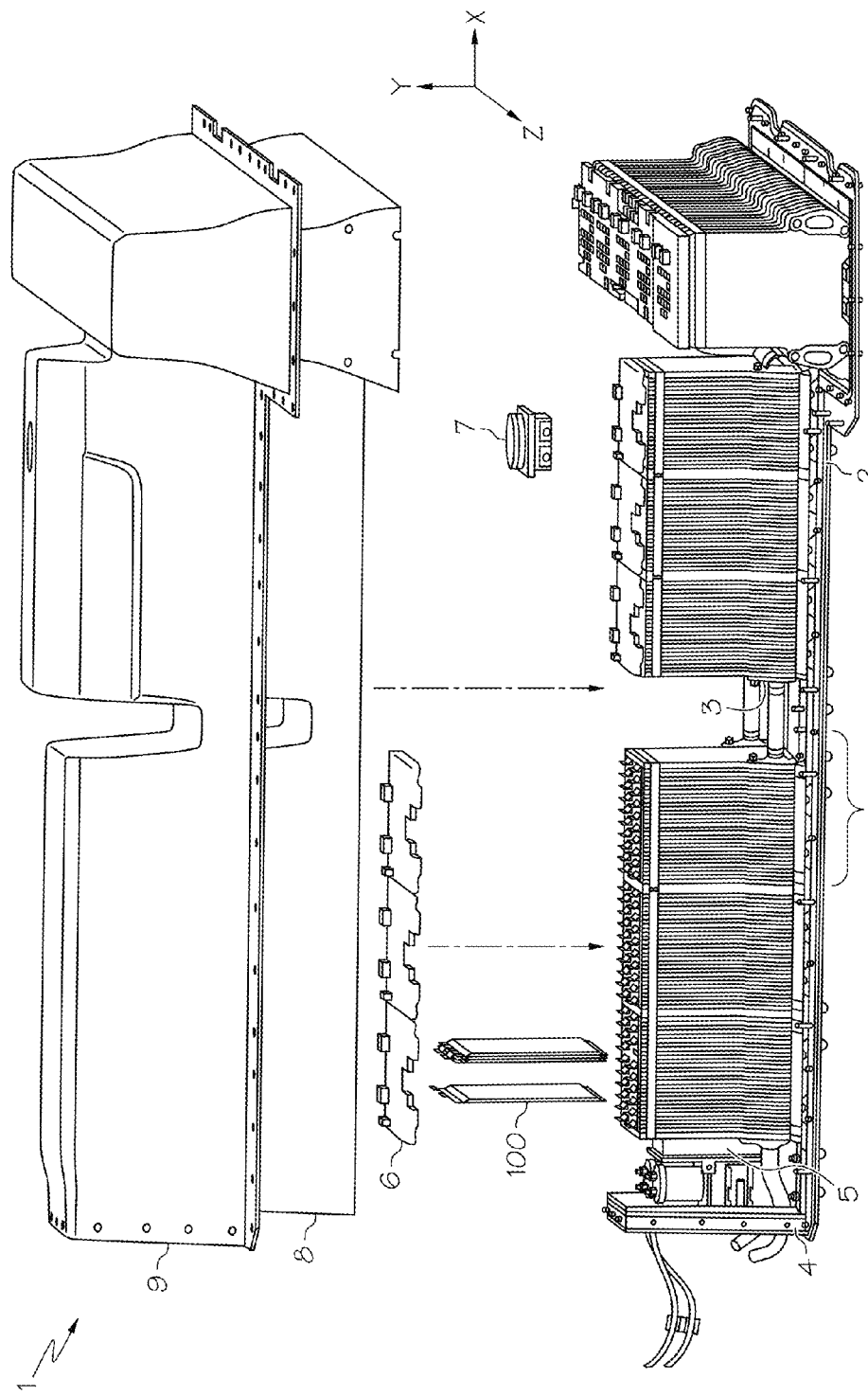
FIG. 1 shows a notional vehicular propulsion system in the form of a battery pack.

Referring initially to FIG. 1, a battery pack 1 employing numerous battery modules 10 with cells 100 is shown in a partially-exploded view. Depending on the power output desired, numerous battery modules 10 may be combined into larger groups or sections; such may be aligned to be supported by a common tray 2 that can also act as support for coolant hoses 3 where supplemental cooling may be desired. In the present context, the terms "battery cell", "battery module" and "battery pack" (as well as their shortened variants "cell", "module" and "pack") are used to describe different levels of components of an overall battery-based power system, as well as their assembly. For example, numerous individual battery cells form the building blocks of battery modules. Numerous battery modules (in conjunction with ancillary equipment) in turn make up the completed battery pack.

A bulkhead 4 may define a primary support structure that can function as an interface for the coolant hoses 3, as well as house a battery disconnect unit in the event battery service is required. In addition to providing support for the numerous battery modules 10, tray 2 and bulkhead 4 may support other modules, such as a voltage, current and temperature measuring module 5. Placement of individual battery cells 100 within one of battery modules 10 is shown, as is the covering thereof by a voltage and temperature sub-module 6 in the form of plug connections, busbars, fuses or the like. Although shown notionally in a T-shaped configuration, it will be appreciated by those skilled in the art that battery pack 1 may be formed into other suitable configurations as well. Likewise, battery pack 1 may include—in an exemplary configuration—between about two hundred and three hundred individual battery cells 100, although (like the arrangement) the number of cells 100 may be greater or fewer, depending on the power needs of the vehicle. In one exemplary form, battery pack 1 is made up of three sections a first of which consists of two modules 10 with thirty six cells 100 in each module 10 to make a seventy two cell section located along the vehicular longitudinal axis of the T-shaped battery pack 1, a second of which consists of two modules 10 with thirty six cells 100 in each module 10 and one module with eighteen cells 100 to make a ninety cell section (also located along the vehicular longitudinal axis) and a third (located on the vehicular lateral axis of the T-shaped battery pack 1) made up of three modules 10 with thirty six cells 100 in each module 10 and one module with eighteen cells 100 to make a one hundred and twenty six cell section for a total of two hundred and eighty eight such cells. Other features, such as manual service disconnect 7, insulation 8 and a cover 9 are also included in the battery pack 1. In addition to the aforementioned battery disconnect unit, other power electronic components (not shown) may be used, including a battery management system or related controllers.

Figure 2:
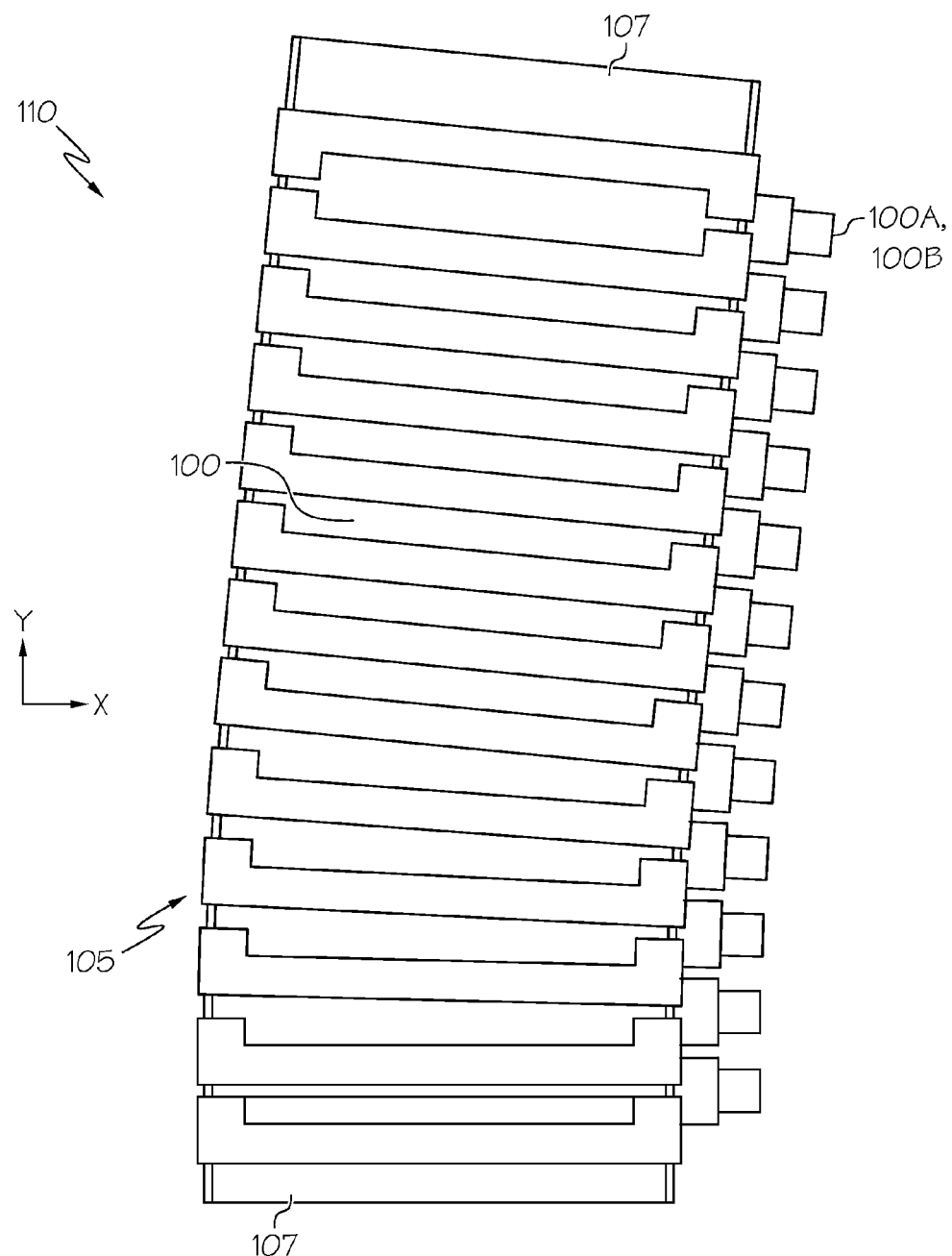
FIG. 2 shows a vertical stacking orientation of numerous battery cell/frame assemblies according to the prior art.

Referring next to FIG. 2, a conventional vertical battery stacking approach according to the prior art is shown. The battery assembly 110 (also referred to herein as a subassembly to signify it being the building-block of a larger module, pack or the like) includes repetitive stacking of the battery cells 100, frames 105 and end plates 107. Unfortunately, a charged battery cell with prismatic can has a tendency to bulge on both sides of the stacking surfaces, which reduces the generally planar nature of contact between adjacent cells 100. This in turn impacts the stability of the vertical stacking approach, especially as the stack height increases along the y-axis. This reduced stability is shown presently in the form of the stacked battery assembly 110 leaning to the right.

Figure 3:
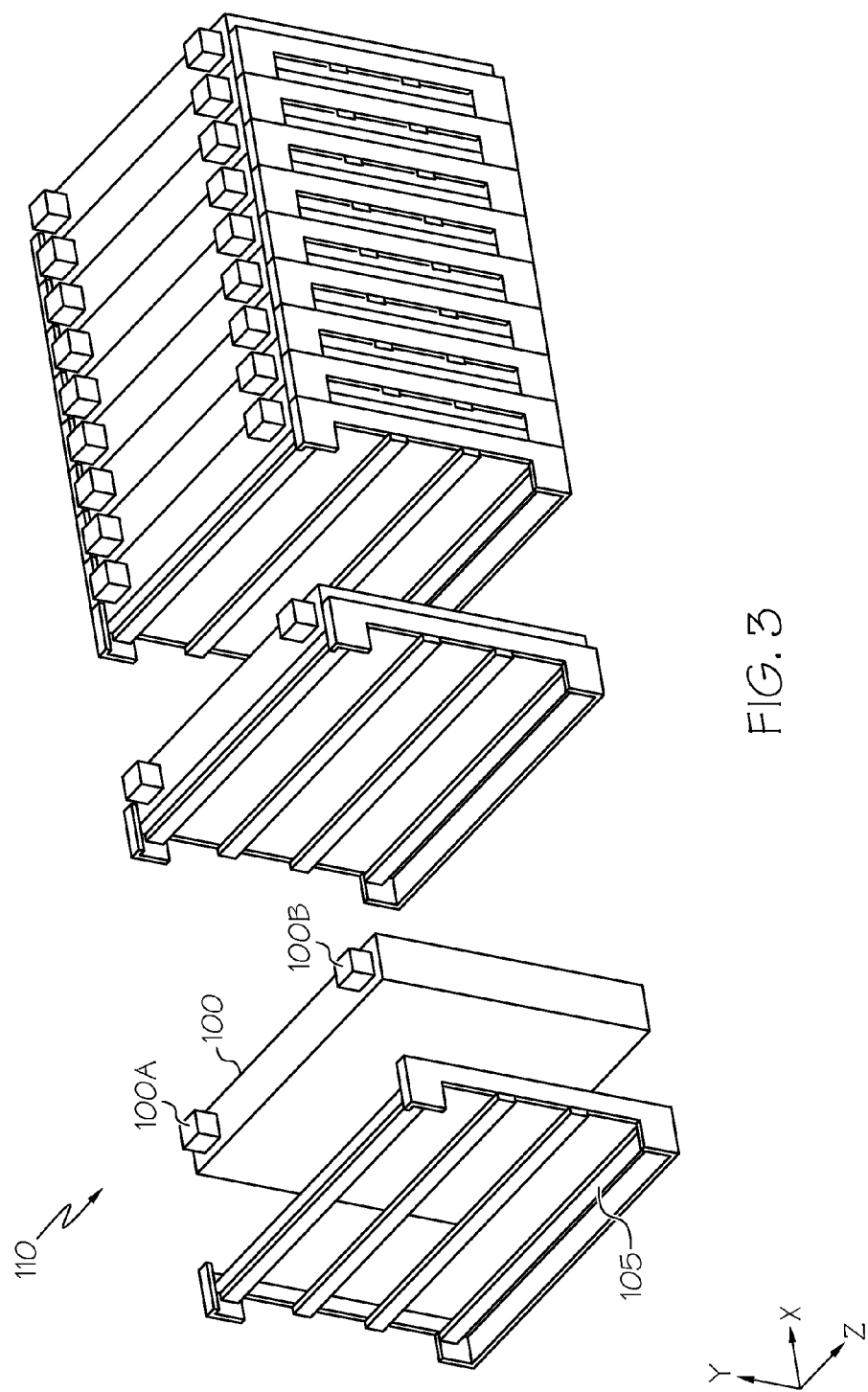
FIG. 3 shows a partially exploded view of a horizontal stacking orientation of numerous battery cell/frame assemblies according to an aspect of the present invention.

Referring next to FIG. 3, assembly 110 made up of a cell 100 and a frame 105 is shown in an exploded view along a substantially horizontal (i.e., x-axis) direction. In both FIGS. 2 and 3, it can be seen that the assemblies 110 define a generally prismatic construction made up of an anode and a cathode (with corresponding positive and negative tabs or related contacts 100A, 100B) separated by an electrolytic membrane (details not shown). Additional details, such as cooling plates, fins and related structure—although not shown—may also form a part of each assembly 110. As mentioned above, horizontal stacking does not have the stack height problem that plagues the vertically-stacked approach of FIG. 2.

Figure 4:
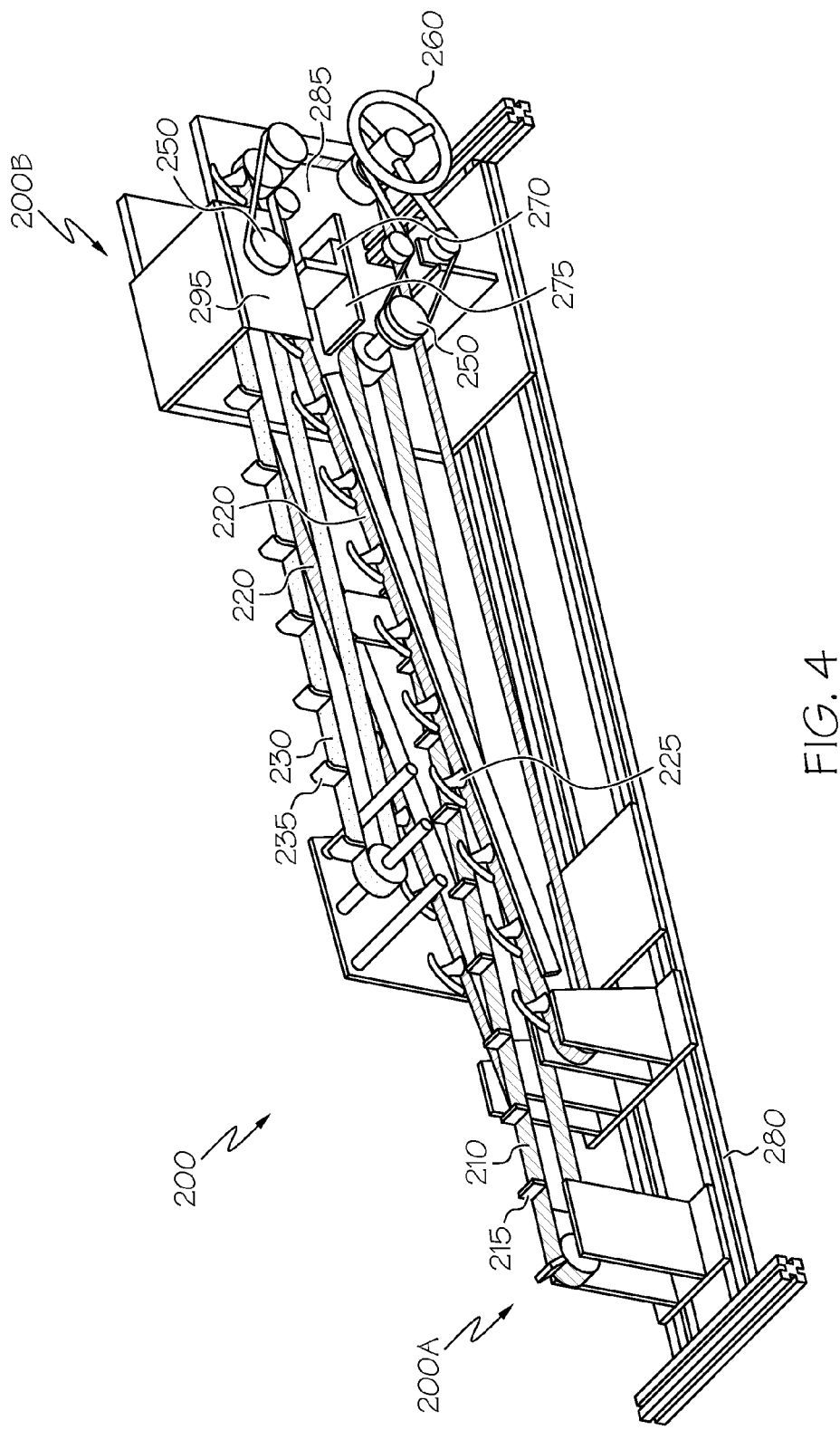
FIG. 4 shows a simplified perspective view of the stacking mechanism according to an aspect of the present invention with some details removed for clarity.
Figure 5:
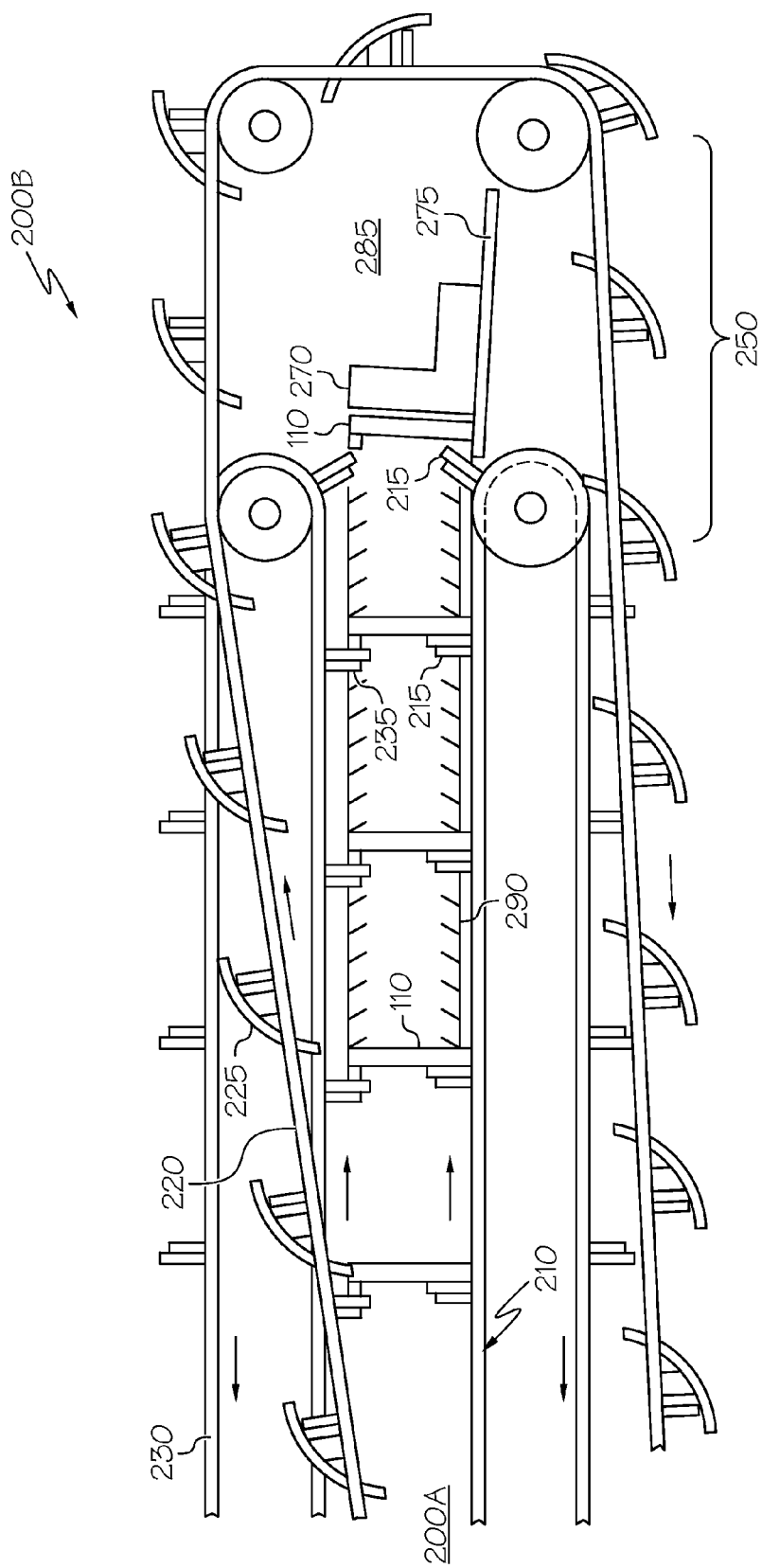
FIG. 5 shows a simplified elevation view of a portion of the changes in stacking orientation of one of the assemblies as it traverses the stacking mechanism of FIG. 4.
Figure 6:
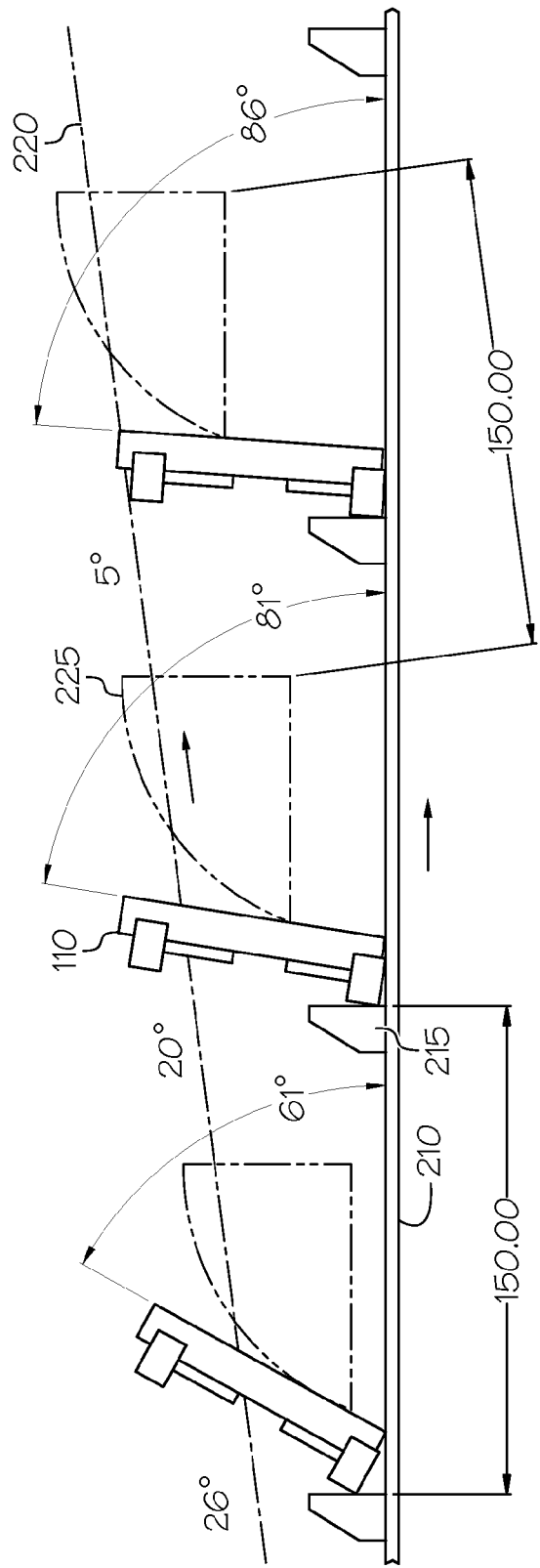
FIG. 6 shows the cooperation of the various belts that make up the stacking mechanism of FIG. 4, including placement of numerous assemblies along a horizontal stacking axis.

Referring next to FIG. 4, a battery stacking mechanism (or system) 200 defines a cell-receiving end 200A and a stacking end 200B. Stacking mechanism 200 includes numerous conveyor belts 210, 220 and 230 cooperative with one another such that upon receipt of numerous individual frame/cell assemblies 110, stacking mechanism 200 reorients the assemblies 110 from a generally vertical stacking direction to a generally horizontal stacking direction as a way to avoid the misalignment and related stacking problems that may arise when the numerous battery cells 100 are in a bulged condition. Additional components, including backstops 215 (on the main belt 210) and 235 (on the upper belt 230), assembly flippers 225, stabilizers (described below) and one or more access windows 285 for retrieving a battery assembly 110 may also be used. The backstops 215 and 235—by virtue of being affixed or otherwise fastened to their respective belts 210 and 230—provide a secure lower mounting surface for the assemblies 110 to help carry them forward (i.e., in a left-to-right registered pattern as shown in FIGS. 4 through 6) until such time as they reach a suitable stacking receptacle (discussed below), while backstops 235 provide additional support at the upper edge of the assemblies 110 once they have been tilted upward in a 90° position relative to the surface of main belt 210; this latter support is shown with particularity in FIG. 6. One attribute that is significant in helping to establish and maintain registry between the belts 210, 220 and 230 is the pitch P; this is a measure of the distance between similar spots on adjacent backstops 215 or 235 (on the main belt 210 and the upper belt 230) or adjacent flippers 225 (on flipper belt 220). In one exemplary form, such a pitch P could be on the order of 150 millimeters. Significantly, the present invention does away with the need for cams, lifters or related protuberances that would otherwise cause an undulation or related deviation from the generally planar construction in the travel path of the conveyor belts 210, 220 and 230.

A series of gears, pulleys and related equipment 250 is also included to provide registered (i.e., meshed, synchronous) interaction of the various belts 210, 220 and 230. These components may make up part of (or in the alternative be coupled to) one or more drives (including a central drive 260) can be used to impart rotational motion to the conveyor belts 210, 220 and 230; such drives may be part of (or in turn receive motive power through) a suitable engine (not shown). The pulley and gear train making up equipment 250 enables the three (or four) belts 210, 220 and 230 to run synchronously with central drive 260 where arrows show one exemplary form of cooperative movement between them.

The aforementioned receptacle is in the form of a stacking stand 270 that is placed at a remote end of stacking mechanism 200; stacking stand 270 is configured to receive the horizontally-stacked assemblies 110 such that subsequent assembly operations (such as attaching electrical connections, cooling connections or the like) may be performed. In one form, stacking mechanism 200 is placed on a sled or frame 280 to facilitate modular construction. The stacked cells or assemblies 110 that have accumulated on the stacking stand 270 will exit through the enclosure 295 (as shown at the stacking end 200B of stacking mechanism 200) and continue for further processing. To be suitable for pack assembly, the stacked cells or assemblies 110 may be subjected to a compressing operation through cooperation between movable and stationary holding tools (not shown); additional lateral support may be provided through mounted guides (not shown). This compression may be configured to impart one of a predetermined force or distance, depending on cell 100 structural needs, cooling fin design or the like. In one preferred embodiment, the compression forces range from between about one hundred Newtons and about four thousand Newtons, while a compressive displacement may be between about one and thirty millimeters. Once this predetermined level is reached, a box-like frame (not shown, but for example configured as a U-shaped structure with its own end plate with interlocking features) is secured around the compressed stack, after which a cover (which may include wiring harnesses, busbars, connectors and ancillary electronic equipment) is attached to the stack and frame that in turn may be secured through known means, such as welding (for example, ultrasonic welding, resistance welding or laser welding) mechanical fastening or the like. It will be appreciated by those skilled in the art that some of the details of stacking mechanism 200 are either not shown (for example, certain belts or other conveying or connectivity mechanisms) or simplified in order to promote clarity in the remaining features.

Significantly, each of the conveyor belts 210, 220 and 230 define a continuous, closed loop construction. As such, once each belt 210, 220 and 230 has completed its portion of the delivery or reorientation of the assemblies 110, its members return to an initial takeup point to gather up a new batch of cells 100 or their related assemblies 110. Significantly, features included in at least the main belt 210 and the upper belt 230 are used on both the feed and return trips. In particular, periodically-spaced backstops 215, 235 that are mounted into or on top of the main and upper belts 210, 230 help ensure accurate positioning of the assemblies 100 both before and after reorientation. Thereby significantly increasing speed over conventional systems such as pick-and-place, where—in addition to empty return trips for incoming parts—the opening and closing of grippers and related components tend to slow down movement in approaching or positioning parts. In fact, the prismatic nature of the cans used to encase the individual battery cells 100 are inherently easy to handle by the present invention due to their rigid structure and well defined dimensions.

The first of the conveyor belts 210 is referred to as the main belt 210 that carries forward the assemblies 110 of battery cells 100 and cooling frames 105 to be stacked. In a preferred form, there are two flipper conveyor belts 220 that straddle main belt 210 along its opposing lateral sides; while delivering the assemblies 110 for stacking, all three belts move in the same general left-to-right direction as shown in the figure, although the flipper belts 220 may be inclined by a small amount (for example, about 5° relative to the x-axis) relative to the main belt 210. Flippers 225 and backstops 215 are mounted onto their respective belts 220, 210 in a repeating, periodic pattern. Upper belt 230 assists the main belt 210 in transporting and stacking the battery assemblies 110 with backstops 235 that are generally similar to backstops 215; this assistance is particularly helpful once the cells 100 or assemblies 110 have been rotated into their substantially upright (i.e., where the largest planar surface of the cell or assembly is oriented 90° relative to the surface of main belt 210) position. The central drive 260 is engaged with the belts 210, 220 and 230 such that they can all be moved simultaneously and synchronously through the gears, pulleys and related equipment 250. By virtue of this geared relationship, all of the conveyor belts 210, 220 and 230 move continuously and synchronously, thereby facilitating high speed meshed operation.

Referring next to FIGS. 5 and 6 in conjunction with FIG. 4, flippers 225 act as moving lifters by being attached at a fixed pitch relative to the flipper belt 220 that flanks the main belt 210 on both sides. Moreover, the flippers 225 define a generally arcuate shape such that upon engagement with the battery assemblies 110 and progression from left-to-right as shown, the flippers 225 that straddle the main belts 210 gradually coax the assemblies 110 into successively more edgewise placement on the main belt 210. In this way, the flippers 225 act like moving cam lifters on opposing sides of the main belt 210 to promote the horizontal stacking orientation of the assemblies 110; as shown in FIG. 6, three representative angular snapshots of the assembly 110 at 61°, 81° and 86° relative to the horizontal (i.e., x-axis) respectively are shown. In one form, the two flipper belts 220 may be driven by a coaxial pulley; such a device simplifies the drive train; to unload a stacked set of assemblies from the stacking stand's backstop 270 with such an axle arrangement will require a stack exit window 285 situated along a sideways (i.e., z-axis) exit. Battery stacking mechanism 200 uses the backstops 215 that are situated on main belt 210 along with one of the flippers 225 that pass by on the flipping belt 220 to keep each of the cells 100 (or their respective assembly 110) registered with respect to the immediately preceding and succeeding cells that are traversing main belt 210. In the present context, adjacent cells 100 or their assemblies 110 are considered to be registered as long as they maintain their intended position and orientation while traversing the stacking mechanism 200; in one form, such registration may be judged by the various cells 100 maintaining a desired degree of horizontal (x-axis) spacing or rotational orientation between them to ensure a predetermined stacking configuration. Geared cooperation between various components (such as the various conveyor belts 210, 220 or 230) are considered to be registered as long as they maintain the timing, spacing, meshing or related operation to ensure delivery of the cells 100 or assembles 110 from start to finish. Contrarily, when one or more cells 100 or assemblies 110 gets out of registry, the potential for misalignment or other stacking problems may arise.

As shown with particularity in FIG. 5, assemblies 110 with their largest planar surfaces oriented in a substantially vertically-facing direction are introduced to the stacking mechanism 200 along the main belt 210 at the left side (not shown). Because the assembly 110 defines a width that is greater than the main belt 210, the flippers 225 are able to contact the assembly 110 from below. Because of the angled relationship mentioned above between the belts 210 and 220, the flippers 225 start off on the left side of the stacking mechanism 200 being below the main belt 210, during this early stage, flippers 225 have no engagement with the subassemblies 110. As the belts move simultaneously to the right, the flippers 225 move up progressively above the main belt 210, thereby lifting the assemblies 110 such that the surface of their largest planar dimension goes from being aligned to a vertical (i.e., y-axis) to a horizontal (i.e., x-axis) with the help of stops 215 on the main belt 210. When the flipper 225 moves to a point higher along the y-axis than the assembly 110, the two become disengaged, this allows the assembly 110 to proceed to the stacking stand 270 on the far right of the stacking mechanism 200. A stabilizer 290 (which may be outfitted with brushes or soft friction pads), lightly contacts the side edges of the cells 100 or assemblies 110 to prevent them from tipping forward before stacking.

As the assemblies 110 move from the conveyor belts 210, 220 to the stacking stand 270, the stacking stand 270 slides by the conveyor force until the backstops 215, 235 disengage from the cells 100 or assembly 110. The inertial forces also move the backstop 270 in the stacking direction. The backstop 270 of the stacking stand is keyed to the stacking stand plate 275 to allow movement in the x-axis and is held with an adjustable friction device (e.g. spring loaded) to provide resistance as the assemblies 110 exit the conveyor belts 210, 220. Furthermore, the stacking stand plate 275 is adjustable to a negative angle (i.e. −5 degrees) to allow the assemblies to fall against each other and use gravity to rest against the backstop 270. Thus, the stacking stand plate 275 acts as the base plate that the cells 100 or assemblies 110 move onto when they come off of the main belt 210.

Significantly, the use of the approach depicted in FIGS. 4 through 6 facilitates high speed stacking for assemblies 110 by positioning the parts to stack without the individual (i.e., robotic) manipulations associated with conventional pick-and-place-based equipment. Moreover, by conveying parts that are loosely assembled at high speeds along edgewise orientations (with concomitant small component footprint), a much smaller amount of manufacturing floor space is required.

Referring next to FIGS. 7A and 7B, an alternative embodiment shows that the two conveyor belts 220 with the flippers 225 can be driven by parallel axles, which allow the stacked cells 100 or assemblies 110 to exit more conveniently in the direction of stacking as they approach the stacking end 200B of the system 200. FIG. 7A shows the embodiment in a side elevation view and FIG. 7B shows a top elevation view. Referring with particularity to FIG. 7B, the two conveyor belts 220 with the flippers 225 may be oriented such that rather than the selective engagement of the flippers 225 and cells 100 or assemblies 110 taking place through an angled intersection of their respective belts 210 and 220, they engage through a sideways cooperation of the belts. In this embodiment, the flipper 225 is mounted to the face of the conveyor belt 220, rather than being mounted to a lateral (i.e., side) as described above. This mounting strategy results in less twist and tension in the conveyor belt 220, which helps improve the life of the belt and allow better assembly 110 alignment for stacking. A different view of the stabilizer 290 with brushes shows how it contacts the side edges of the cells 100 or assemblies 110 to prevent them from tipping forward prior to stacking against backstop 270.

While certain representative embodiments and details have been shown for purposes of illustrating the invention, it will be apparent to those skilled in the art that various changes may be made without departing from the scope of the invention, which is defined in the appended claims.

What is claimed is:

1. A system for stacking a plurality of prismatic-shaped battery cells, said system comprising:
   a plurality of conveyor belts comprising a first belt and a pair of second belts that straddle said first belt and traverse a path that is inclined relative to said first belt, said pair of second belts rotate about an axis that is substantially orthogonal to an axis of rotation of said first belt, said plurality of conveyor belts cooperative with one another such upon traversal of said cells along said first belt, at least one flipping device defining a generally curvilinear surface contacts a respective one of said cells being conveyed along said first belt, said flipping device situated on at least one of said second belts such that upon cooperative movement of said first and second belts along a generally similar direction from a receiving end of said system to a stacking end of said system, said curvilinear surface on said flipping device causes said cells to rotate while on said first belt such that the largest, generally planar surface of said prismatic shape of each of said rotated cells is defined in a substantially horizontal stacking direction by the time said rotated cells arrive at said stacking end;
   at least one driving device cooperative with at least one of said plurality of conveyor belts to provide motive power thereto; and
   a receptacle to receive said rotated cells from said first belt.

2. The system of claim 1, further comprising a device to compress said rotated cells once they have been received in said receptacle.

3. The system of claim 1, further comprising at least one backstop situated on said first belt, said backstop and said at least one flipping device cooperative with one another during cell contact to keep said cells registered with respect to one another while traversing said first belt.

4. The system of claim 3, further comprising a third belt to include at least one backstop situated thereon to cooperate with said backstop on said first belt and said at least one flipping device to provide additional support to said cells while traversing said first belt.

5. The system of claim 1, wherein said receptacle comprises a stacking stand configured to receive said cells once they have been placed in said substantially horizontal stacking direction.

6. The system of claim 1, wherein no portion of any of said plurality of conveyor belts that provides contact with said cells during rotation thereof defines an undulation.

7. The system of claim 1, wherein said first belt is configured to receive said cells while they are in a substantially vertical stacking direction.

8. The system of claim 1, wherein said plurality of conveyor belts are kept in registry with one another through a plurality of gears, pulleys and axles that make up said driving device.

9. A system for stacking a plurality of prismatic-shaped battery cells, said system comprising:
   a plurality of conveyor belts comprising:
      a first conveyor belt with a plurality of backstops spaced in a repeating fashion thereon; and
      a second conveyor belt comprising a pair of belts that straddle said first conveyor belt and traverse a path that is inclined relative to said first conveyor belt, said pair of belts rotate about an axis that is substantially orthogonal to an axis of rotation of said first conveyor belt, each of said second belts configured with a plurality of flippers attached thereto and spaced in a repeating fashion thereon, each of said flippers defining a generally curvilinear surface to contact a respective one of said cells being conveyed along said first conveyor belt, said first conveyor belt and said second conveyor belt cooperative with one another to move to said cells in a generally similar direction from a receiving end of said system to a stacking end of said system such that for each of said plurality of cells, one of said backstops facilitates translation of said each cell from said receiving end to said stacking end, while said curvilinear surface on said flipper comes into contact with a corresponding one of said cells to facilitate rotation of the largest, generally planar surface of said prismatic shape of said each cell from a substantially zero degree angle relative to said first conveyor belt at said receiving end of said system to substantially ninety degree angle relative to said first conveyor belt at said stacking end of said system;
   at least one driving device cooperative with at least one of said plurality of conveyor belts to provide motive power thereto; and
   a stacking stand situated at said stacking end of said system to receive each of said translated and rotated cells.

10. The system of claim 9, further comprising a third conveyor belt with a plurality of backstops spaced in a repeating fashion thereon, said third conveyor belt configured to move in a direction substantially similar to said first conveyor belt such that said respective backstops cooperate to provide support to said rotated cells.

* * * * *